(No Model.)
S. HARTSHORN.
SPRING SHADE ROLLER.
No. 293,871.  Patented Feb. 19, 1884.
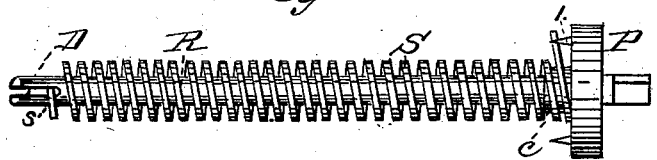
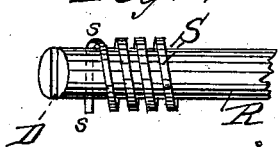 
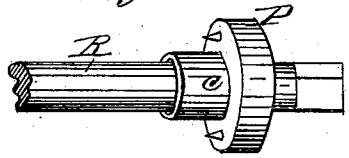 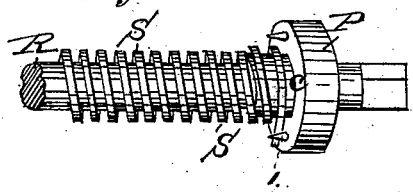
Witnesses.
Samuel Lea
Inventor.
Stewart Hartshorn,
Attorneys.

UNITED STATES PATENT OFFICE.

STEWART HARTSHORN, OF MILLBURN, NEW JERSEY.

SPRING SHADE-ROLLER.

SPECIFICATION forming part of Letters Patent No. 293,871, dated February 19, 1834.

Application filed November 6, 1883. (No model.)

*To all whom it may concern:*

Be it known that I, STEWART HARTSHORN, residing in Millburn, in the State of New Jersey, have invented an Improvement in Shade-Rollers, of which the following is a full, clear, and exact description, reference being had to the accompanying drawings, making a part of this specification.

My invention relates to that class of shade-rollers which have a spring within the roller, mounted upon a spindle or shaft, for revolving the roller to wind up the shade, and has for its object a more perfect, economical, and convenient method of connecting the spring to the spindle or shaft and to the roller.

Figure 1 is a view of a complete spring mounted upon the spindle ready to be inserted within the roller. Fig. 2 is an enlarged view of the end of the spindle, showing the manner of attaching the spring to the spindle. Fig. 3 is a view of the inner end of the coiled spring. Fig. 4 is an enlarged view of the outer end of the spindle, showing the end plate to which the spindle is attached. Fig. 5 is a view of the outer end of the spindle and spring with the end plate, showing the method of attaching the spring to the end plate.

The ordinary mode of securing the spring to the spindle is by inserting the end of the spring in a hole bored through the spindle, and then fastening the spring so it cannot be drawn out. As the springs are coiled upon a mandrel before they are mounted upon the spindle or shaft, much difficulty is experienced in bending the end of the tempered spring, so as to insert it in the hole in the spindle, and unless great care is used there is much danger of injuring the coil and of breaking off the end of the spring, in which case a new portion must be bent and the spring thereby shortened. Thus the method commonly employed not only consumes much time and requires care and experience, but frequently occasions the total loss of the spring by the repeated breaking off of the end by bending it for the purpose of inserting it into the hole in the spindle. By my improved mode of connecting the spring and spindle together, I avoid all the difficulty of inserting the end of the spring in the hole in the spindle, and all possibility of breaking or spoiling the spring, and the spring can be attached to the spindle and roller without loss of time.

To carry out my improved method, instead of boring a hole through the spindle near the end, I cut a slot or groove into the spindle across the diameter for a little distance from the end, as will be seen at D, Figs. 1 and 2. When the spring is coiled around the mandrel, one end is bent by means of a slot therein similar to that in the shaft or spindle, as shown at *s*, Fig. 3.

To attach the spring to the spindle, it is only necessary to insert the spindle into the coiled spring and push it through until the bent end of the spring slides into the groove D, and the connection is complete without any bending or other manipulation of the spring. As the other end of the spring is fastened to the roller, the tension of the spring is sufficient to hold the end within the groove and firmly secure the spring to the spindle. The groove may be cut in either end of the spindle, and the spring secured to the same either at its outer or its inner end, the other end of the spring being fastened to the roller by any desirable method; but I prefer to secure the spring to the spindle at its inner end, and to fasten the other end to a head end or end plate, which is attached to the end of the roller. This method avoids all trouble and difficulty of attaching the spring to the roller within the cavity of the latter. The end plate may, however, be constructed as shown at P, Fig. 4, with a collar or ring, C, projecting from its inner face, which encircles the end of the spindle, and which is of a diameter a little greater than the diameter of the coiled spring. The spring being connected with or mounted upon the spindle, as before described, the outer end of the coiled spring is pushed onto the collar C, as shown in Fig. 5, and the circumference of the collar being greater than that of the spring, the latter is caused to tightly encircle the collar and maintain a firm hold thereon. To still further secure the spring, its outer end may be pressed under one of the projections on the plate, which enter the end of the roller, and is thus bent out a little from the collar, so as to be held between the end of the roller and the plate when the two are attached together. This I deem a preferable construction. By this method of attaching the spring by its inner end to the spindle and its outer end to the plate, to which the spindle is connected, the spring, spindle, and plate are all connected together, and are combined with the roller by merely inserting the spring and spindle into the cavity and fastening the plate to the end of the roller. This collar also serves to prevent the spring, however fastened, as it is coiled and uncoiled by the operation of the roller, wearing into the spindle, thereby causing unnecessary and undesired friction.

The flattened end of the spindle, which is held in the bracket, may be attached to the shaft on which the spring is mounted in any suitable manner.

By my improved method, the spring is attached to the spindle without bending or manipulating it in any way, and without danger of being injured, and may be easily and quickly secured to the end plate, and the spring thus mounted upon the spindle can be readily connected with or separated from the roller.

What I claim is—

1. In spring shade-rollers, the combination, with the roller, of a slotted spindle or spring, the latter permanently or fixedly connected at one end to the spindle by the slot therein, and at the other end to the roller, substantially as and for the purposes set forth.

2. In spring shade-rollers, constructing the shaft or spindle on which the spring is mounted with an open slot or groove in its inner end, substantially as and for the purposes set forth.

3. In spring shade-rollers, the combination with the spindle having a groove cut in its inner end, of the head end or end plate of the roller, and the spring attached by one end to the spindle by means of the groove therein, and by the other end to the head end or plate, substantially as and for the purposes set forth.

4. In spring shade-rollers, the combination of the spindle R, having a groove cut in its inner end, the plate P, having the collar C, and the spring S, attached to the spindle by means of the groove, and to the collar, substantially as described, and for the purposes set forth.

STEWART HARTSHORN.

Witnesses:
S. NELSON WHITE,
SAMUEL LEA.

It is hereby certified that in Letters Patent No. 293,871, granted February 19, 1884, upon the application of Stewart Hartshorn, of Millburn, New Jersey, for an improvement in "Spring Shade Rollers," an error appears in the printed specification requiring correction as follows: In line 26, page 2, the word "or" should read *and*; and that the Letters Patent should be read with this correction therein to make it conform to the record of the case in the Patent Office.

Signed, countersigned, and sealed this 4th day of March, A. D. 1884.

[SEAL.]

M. L. JOSLYN,
*Acting Secretary of the Interior.*

Countersigned:
    BENJ. BUTTERWORTH,
        *Commissioner of Patents.*